(12) United States Patent
Jin et al.

(10) Patent No.: US 12,741,628 B2
(45) Date of Patent: Sep. 22, 2026

(54) CONTROL APPARATUS AND METHOD OF ELECTRIC OIL PUMP FOR HYBRID VEHICLE

(71) Applicant: Hyundai Transys Inc., Seosan-si (KR)

(72) Inventors: Joo Seok Jin, Hwaseong-si (KR); Jin Woo Park, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 119 days.

(21) Appl. No.: 18/626,883

(22) Filed: Apr. 4, 2024

(65) Prior Publication Data

US 2025/0313189 A1 Oct. 9, 2025

(51) Int. Cl.
*B60W 10/00* (2006.01)
*B60W 10/30* (2006.01)

(52) U.S. Cl.
CPC ....... *B60W 10/30* (2013.01); *B60W 2510/107* (2013.01)

(58) Field of Classification Search
None
See application file for complete search history.

(56) References Cited

U.S. PATENT DOCUMENTS 10,737,700 B2 * 8/2020 Wang .................. F16H 61/0031
11,162,399 B2 * 11/2021 Ahn ......................... F01M 5/00
2009/0118878 A1 * 5/2009 Park .................... B60L 15/2054 701/22
2011/0176932 A1 * 7/2011 Schultz ............... F16H 61/0031 417/15
2013/0151131 A1 * 6/2013 Laszlo .................... F02D 28/00 180/65.265
2015/0285371 A1 * 10/2015 Schultz ................. F04C 11/001 60/486
2017/0167596 A1 * 6/2017 Nishimine .......... F16H 57/0435
2017/0211688 A1 * 7/2017 Miyamoto .............. F16H 59/72
2017/0232950 A1 * 8/2017 Nishimine ............ B60W 20/00 701/22
2017/0259824 A1 * 9/2017 Kim ...................... B60W 10/30
2019/0367004 A1 * 12/2019 Kim .......................... F01P 1/06

FOREIGN PATENT DOCUMENTS

DE 102012106917 A1 6/2013
DE 102014224861 A1 3/2016
JP 2002213594 A 7/2002
JP 2005214216 A 8/2005
JP 2012197715 A 10/2012
JP 2014034983 A 2/2014
KR 1020130065147 A 6/2013
KR 10-2022-0094279 A 7/2022

OTHER PUBLICATIONS

Examiner, "Office Action for DE Application No. 102024109946.1", Dec. 9, 2024, DPMA, München, Germany.

* cited by examiner

*Primary Examiner* — Truc M Do
(74) *Attorney, Agent, or Firm* — Bridgeway IP Law Group, PLLC; Jihun Kim

(57) ABSTRACT

An apparatus for controlling an electric oil pump for a hybrid vehicle, includes: a determination unit determining whether there is an ultra-low temperature environment based on an oil temperature of an electric oil pump upon shift control of a vehicle; and a control unit performing RPM rising control of the electric oil pump when it is determined that there is the ultra-low temperature environment.

6 Claims, 4 Drawing Sheets

FIG. 2

CONTROL APPARATUS AND METHOD OF ELECTRIC OIL PUMP FOR HYBRID VEHICLE

TECHNICAL FIELD

The present invention relates to an apparatus and a method for controlling an electric oil pump for a hybrid vehicle.

BACKGROUND ART

In general, hybrid vehicles adopt a structure in which power sources made of engines and motors are appropriately combined, and fuel efficiency is improved through the power assistance of a motor operating by the voltage of a battery in a departure or acceleration situation of a vehicle. For example, in the case of the hybrid vehicles, an optimal operation of the engine is performed through power assistance using an electric motor and automatic shift control in the acceleration situation to obtain better fuel efficiency than a vehicle equipped with a gasoline engine and an automatic transmission in related art.

In addition, the hybrid vehicle includes an EV mode in which the vehicle is driven by driving only the motor according to a state of charge (SOC) state of the battery and a driving situation, an engine mode in which the vehicle is driven by driving only the engine, and a hybrid mode in which the engine serve as a main power source and the motor assists the power.

The hybrid vehicle includes an oil pump providing oil for lubrication of the automatic transmission. The oil pump is configured to be driven by an output of the engine as a driving shaft is connected to an output shaft of the engine.

In recent years, the hybrid vehicle has adopted a scheme in which a mechanical oil pump (MOP) is removed, and a flow rate is optimally controlled only by an electric oil pump (EOP) to supply oil for fuel efficiency improvement. That is, the hybrid vehicle adopts and uses the electric oil pump using high voltage of 40 V or higher for supplying a more sufficient flow rate than the mechanical oil pump by removing the mechanical oil pump which is an oil supply module applied to the automatic transmission of a general vehicle.

The electric oil pump is enabled to be driven alone to be applied to the hybrid vehicle, and is configured as an internal gear type.

In the case of the internal gear type of electric oil pump, a motor needs to be driven at approximately 1000 RPM which is required for transmission control and lubricant pressure supply when starting the vehicle.

In the case of the internal gear type electric oil pump, it is initially difficult to drive the motor at 1000 RPM due to a fluid in a thin ice state under an ultra-low temperature environment, so high torque is required upon initial driving, and as a result, a motor capacity is increased.

The internal gear type of electric oil pump is driven at 500 RPM upon initial driving, and then variably controlled to 1000 RPM for reduction of the motor capacity, and as a result, a control process is complicated.

SUMMARY OF THE INVENTION

Therefore, the present invention is contrived considering the situation, and has been made in an effort to provide an apparatus and a method for controlling an electric oil pump for a hybrid vehicle, which reduce a motor capacity by applying a high-voltage electric oil pump of a vane type other than an internal gear type, and an ultra-low temperature environment customized ultra-low temperature control scheme.

An exemplary embodiment of the present invention provides an apparatus for controlling an electric oil pump for a hybrid vehicle, which includes: a determination unit determining whether there is an ultra-low temperature environment based on an oil temperature of an electric oil pump upon shift control of a vehicle; and a control unit performing RPM rising control of the electric oil pump when it is determined that there is the ultra-low temperature environment.

The electric oil pump may be a binary vane type.

The determination unit may compare a temperature value of an oil temperature sensor sensing the oil temperature of the electric oil pump and a predetermined reference temperature, and determine that there is the ultra-low temperature environment when the temperature value is equal to or lower than the reference temperature.

When the control unit performs the RPM rising control when it is determined that there is the ultra-low temperature environment, the control unit may perform rising control to second target RPM higher than first target RPM of the electric oil pump.

The first target RPM may be 500 RPM and the second target RPM may be 1000 RPM.

The control unit may maintain the first target RPM of the electric oil pump when it is not determined that there is the ultra-low temperature environment.

Another exemplary embodiment of the present invention provides a method for controlling an electric oil pump for a hybrid vehicle, which includes: a temperature determination step in which a determination unit determines whether there is an ultra-low temperature environment based on an oil temperature of an electric oil pump upon shift control of a vehicle; and a rising control step in which a control unit performs RPM rising control of the electric oil pump when it is determined that there is the ultra-low temperature environment.

The electric oil pump may be a binary vane type.

The temperature determination step may include comparing, by the determination unit, a temperature value of an oil temperature sensor sensing the oil temperature of the electric oil pump and a predetermined reference temperature, and determining that there is the ultra-low temperature environment when the temperature value is equal to or lower than the reference temperature.

In the rising control step, when the control unit performs the RPM rising control when it is determined that there is the ultra-low temperature environment, the control unit may perform rising control to second target RPM higher than first target RPM of the electric oil pump.

The first target RPM may be 500 RPM and the second target RPM may be 1000 RPM.

The method may further include a proper control step in which the control unit maintains the first target RPM of the electric oil pump when it is not determined that there is the ultra-low temperature environment.

By the apparatus and the method for controlling the electric oil pump for the hybrid vehicle according to exemplary embodiments of the present invention, a motor capacity is reduced by applying a high-voltage electric oil pump of a vane type other than an internal gear type, and an ultra-low temperature environment customized ultra-low temperature control scheme.

Further, motor material cost of the electric oil pump is reduced by reducing the motor capacity.

In addition, a control process for operating the vane type electric oil pump under an ultra-low temperature situation is simplified compared to the internal gear type.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 2 is a block diagram of an apparatus for controlling an electric oil pump for a hybrid vehicle according to an exemplary embodiment of the present invention.

Figure 1:
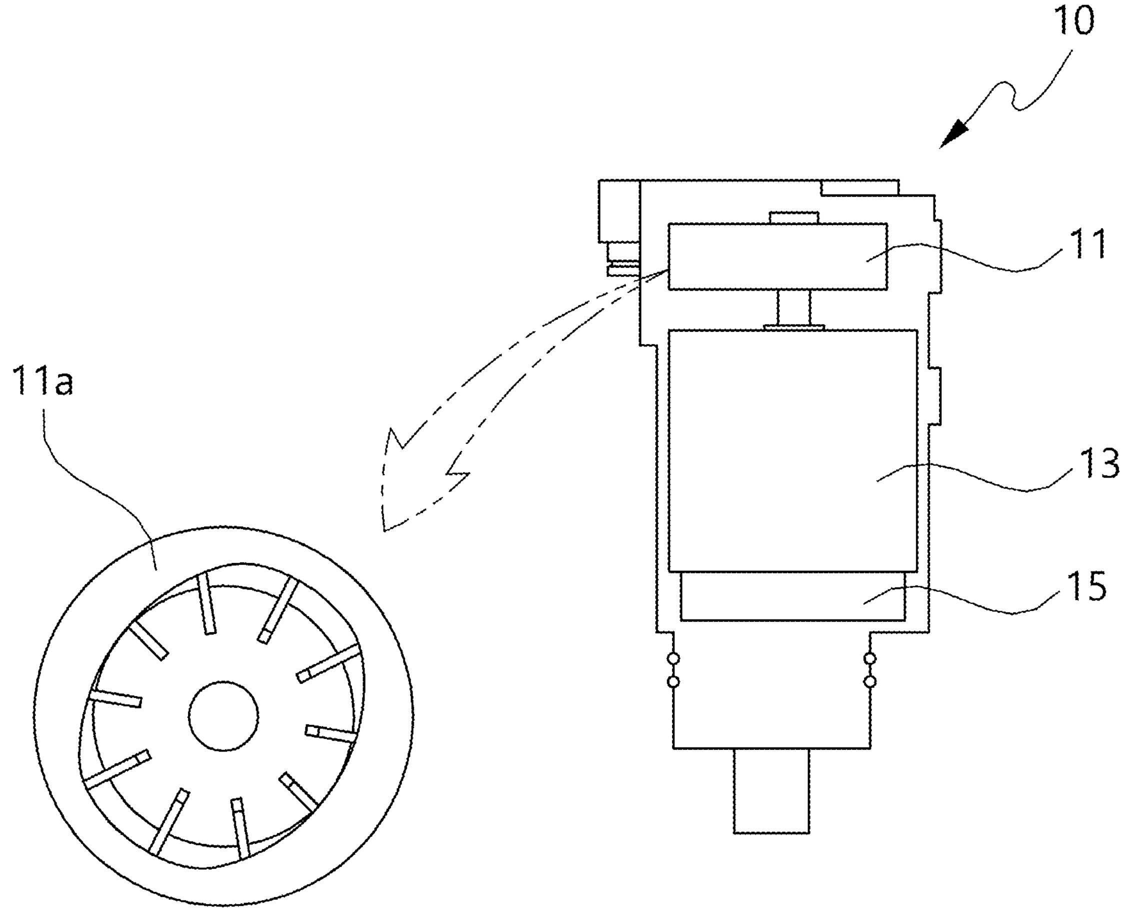
FIG. 1 is a diagram illustrating a schematic structure of a vane type electric oil pump.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an exemplary embodiment of the present invention will be described in detail with reference to the accompanying drawings. First, when reference numerals refer to components of each drawing, it is to be noted that although the same components are illustrated in different drawings, the same components are denoted by the same reference numerals as possible. Further, hereinafter, the preferred embodiment of the present invention will be described, but the technical spirit of the present invention is not limited thereto or restricted thereby and the embodiments can be modified and variously executed by those skilled in the art.

FIG. 1 is a diagram illustrating a schematic structure of a vane type electric oil pump.

Referring to FIG. 1, a vane type electric oil pump 10 includes a pump 11 adopting a binary vane 11*a*, a motor 13 driving the pump 11 and supplying oil to an automatic transmission, and a sensor 15 sensing a rotary position of the motor 13.

There are various factors of determining a motor capacity of the electric oil pump, such as high-temperature and high-pressure conditions, and an ultra-low temperature (approximately-35° C. or lower) condition is also a main factor of determining driving torque and the motor capacity.

In the case of the vane type electric oil pump 10, when the motor 13 is initially driven, oil inside the pump 11 becomes like a thin ice under the ultra-low temperature condition, and a vane is not properly unfolded at 1000 RPM or less, so a situation in which oil discharge is impossible may occur.

That is, when the motor is initially driven at 500 RPM under the ultra-low temperature condition (e.g., −35° C. or lower), the vane may not be unfolded by centrifugal force due to structural characteristics.

The binary vane is not properly unfolded for first several turns due to the above reason, but then, after a predetermined time elapses, the binary vane may be properly unfolded. By considering the structural characteristics of the binary vane, it is necessary to control the electric oil pump.

Figure 2:
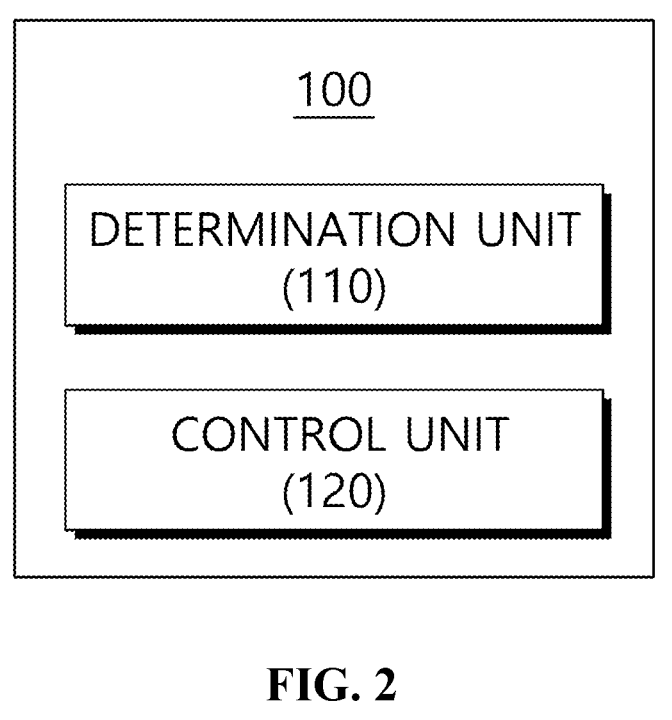

FIG. 2 is a block diagram of an apparatus for controlling an electric oil pump for a hybrid vehicle according to an exemplary embodiment of the present invention.

Referring to FIGS. 1 and 2, the apparatus 100 for controlling an electric oil pump for a hybrid vehicle according to an exemplary embodiment of the present invention performs RPM rising control instantaneously by preparing for a situation in which the vane is not unfolded upon initial driving of the vane type electric oil pump 10 under an ultra-low temperature condition.

The apparatus 100 for controlling an electric oil pump for a hybrid vehicle according to an exemplary embodiment of the present invention includes a determination unit 110 and a control unit 120.

The determination unit 110 determines whether there is an ultra-low temperature environment upon shift control during driving of the vehicle. The determination unit 110 may determine that there is the ultra-low temperature environment when a temperature value received through an oil temperature sensor sensing an oil temperature of the oil pump is approximately equal to or lower than a reference temperature. The reference temperature may be approximately −35° C.

The control unit 120 may perform RPM rising control of the vane type electric oil pump when it is determined that there is the ultra-low temperature environment upon the shift control of the vehicle. In this case, the control unit 120 increases target torque to raise the RPM of the motor from 500 RPM (hereinafter, referred to as first target RPM) to 1000 RPM (hereinafter, referred to as second target RPM). Through this, it is possible to prevent a situation in which the binary vane of the vane type electric oil pump is not properly unfolded in vehicle shift and ultra-low temperature environment, so the oil is not discharged.

The control unit 120 may properly control the motor of the vane type electric oil pump when it is not determined that there is the ultra-low temperature environment upon the shift control of the vehicle. In this case, the control unit 120 may maintain the motor RPM in the first target RPM without changing the target torque.

Figure 3:
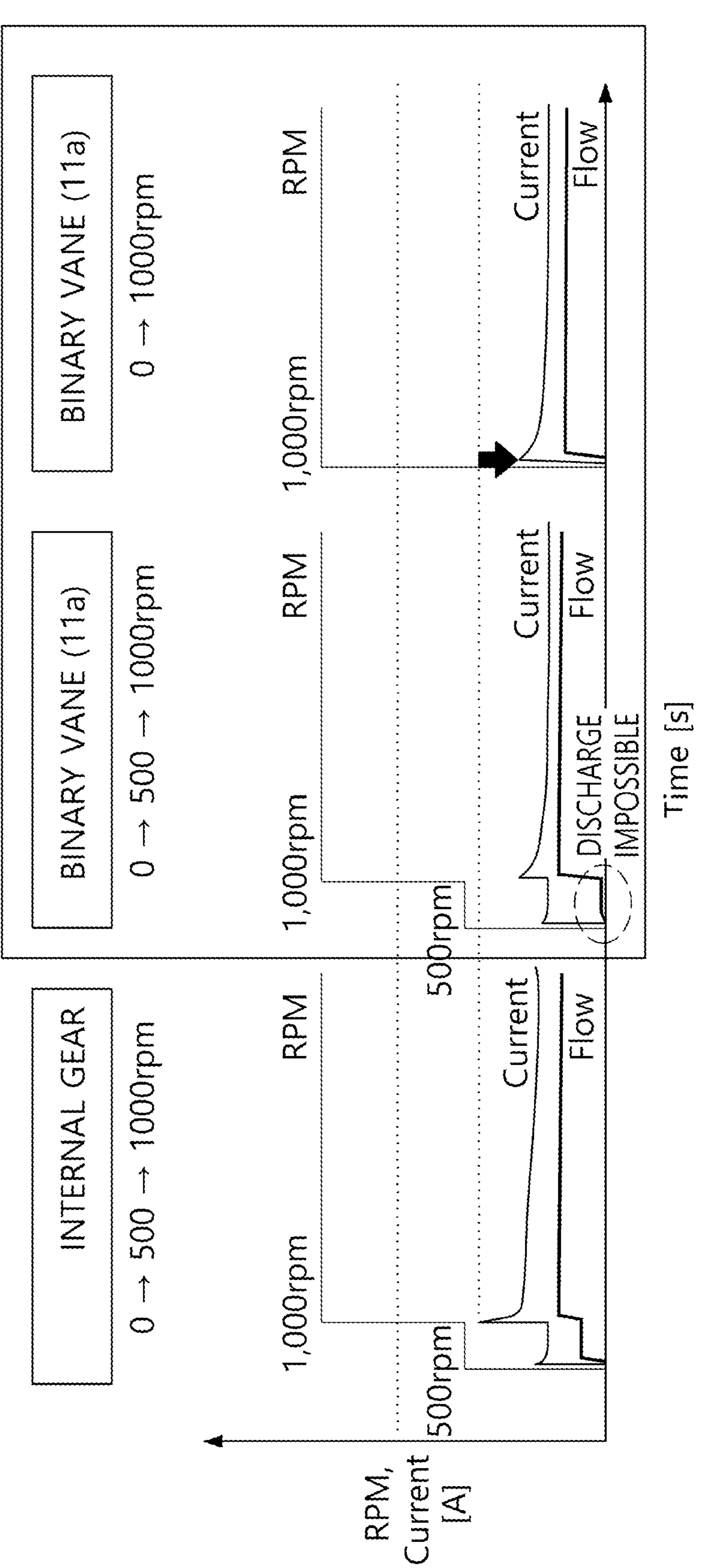
FIG. 3 is a diagram illustrating RPM for each gear according to ultra-low temperature control of the electric oil pump.

FIG. 3 is a diagram illustrating RPM for each gear according to ultra-low temperature control of the electric oil pump.

Referring to FIG. 3, changes of current and oil flow according to motor RPM for each gear of the electric oil pump may be confirmed.

In the internal gear type electric oil pump, initial 500 RPM is controlled to be raised to 1000 RPM after motor driving under the ultra-low temperature environment, so the oil flow may be smoothly made.

In the case of the vane type electric oil pump, when the motor is driven at initial 500 RPM under the ultra-low temperature environment, the vane is not properly unfolded due to structural characteristics, so a situation in which oil discharge is impossible may occur.

As a result, in the case of the vane type electric oil pump, the motor is driven at initial 1000 RPM or more RPM under the ultra-low temperature environment, so the vane is properly unfolded through centrifugal force, which enables oil to be properly discharged.

Figure 4:
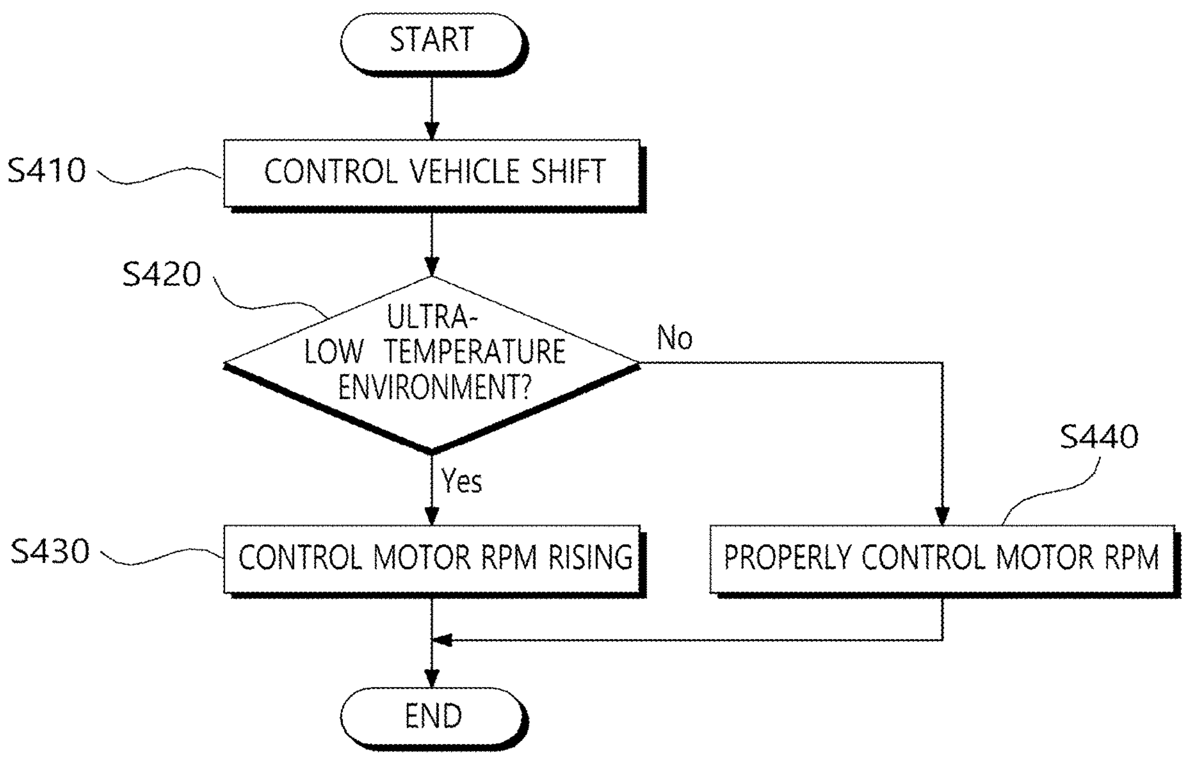
FIG. 4 is a flowchart of a method for controlling an electric oil pump for a hybrid vehicle according to an exemplary embodiment of the present invention.

FIG. 4 is a flowchart of a method for controlling an electric oil pump for a hybrid vehicle according to an exemplary embodiment of the present invention.

In a shift control step (S410), the control unit 120 may perform shift control of the vehicle according to a user command or a vehicle driving environment.

In a temperature determination step (S420), the determination unit 110 determines whether there is an ultra-low temperature environment upon shift control during driving of the vehicle. The determination unit 110 may determine that there is the ultra-low temperature environment when a temperature value received through an oil temperature sensor is approximately equal to or lower than a reference temperature. The reference temperature may be approximately −35° C.

In a raising control step (S430), the control unit 120 may perform motor RPM rising control of the vane type electric oil pump when it is determined that there is the ultra-low temperature environment upon the shift control. In this case, the control unit 120 increases target torque to raise the RPM of the motor from 500 RPM (first target RPM) to 1000 RPM (second target RPM). Through this, it is possible to prevent a situation in which the binary vane of the vane type electric oil pump is not properly unfolded under the ultra-low temperature environment, so the oil is not discharged.

In a proper control step (S440), the control unit 120 may properly control the motor of the vane type electric oil pump when it is not determined that there is the ultra-low temperature environment upon the shift control. In this case, the control unit 120 may maintain the motor RPM in the first target RPM without changing the target torque.

The above description just illustrates the technical spirit of the present invention and various changes, modifications, and substitutions can be made by those skilled in the art to which the present invention pertains without departing from an essential characteristic of the present invention. Therefore, the embodiments and the accompanying drawings disclosed in the present invention are used to not limit but describe the technical spirit of the present invention and the scope of the technical spirit of the present invention is not limited by the embodiments and the accompanying drawings.

The steps and/or operations according to the present invention may occur in different orders, in parallel, or concurrently in other exemplary embodiments for other epochs or the like, as may be understood by those skilled in the art.

Depending on the exemplary embodiment, at least some or all of the steps and/or operations may be implemented or performed by using commands, programs, and interactive data structures stored in one or more non-transitory computer-readable media, and one or more processors driving a client and/or a server. The one or more non-transitory computer-readable media may be, by way of example, software, firmware, hardware, and/or any combination thereof. Further, the functions of the "module" discussed in this specification may be implemented by software, firmware, hardware, and/or any combination thereof.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for controlling a binary vane electric oil pump for a vehicle that is devoid of a mechanical oil pump, the apparatus comprising:

at least one processor configured to:

upon initiation of shift control of the vehicle and prior to initiation of an operation of the binary vane electric oil pump, compare an oil temperature of the binary vane electric oil pump with a predetermined reference temperature;

determine whether the oil temperature of the binary vane electric oil pump is an ultra-low temperature, the oil temperature being the ultra-low temperature when the oil temperature is equal to or lower than the predetermined reference temperature; and perform RPM rising control of the binary vane electric oil pump by increasing an RPM of the binary vane electric oil pump from a first target RPM to a second target RPM higher than the first target RPM when it is determined that the oil temperature is the ultra-low temperature.

2. The apparatus of claim 1, wherein the first target RPM is 500 RPM and the second target RPM is 1000 RPM.

3. The apparatus of claim 1, wherein the at least one processor is configured to maintain the first target RPM of the binary vane electric oil pump when it is not determined that the oil temperature is the ultra-low temperature.

4. A method for controlling an electric oil pump for a vehicle that is devoid of a mechanical oil pump, the method comprising:

upon initiation of shift control of the vehicle and prior to initiation of an operation of the electric oil pump, comparing, by at least one processor, an oil temperature of the electric oil pump with a predetermined reference temperature;

determining, by the at least one processor, whether the oil temperature is an ultra-low temperature, the oil temperature being the ultra-low temperature when the oil temperature is equal to or lower than the predetermined reference temperature; and performing, by the at least one processor, RPM rising control of the electric oil pump by increasing an RPM of the electric oil pump from a first target RPM to a second target RPM higher than the first target RPM when it is determined that the oil temperature is the ultra-low temperature, wherein the electric oil pump is a binary vane electric oil pump.

5. The method of claim 4, wherein the first target RPM is 500 RPM and the second target RPM is 1000 RPM.

6. The method of claim 4, further comprising:

maintaining, by the at least one processor, the first target RPM of the electric oil pump when it is not determined that the oil temperature is the ultra-low temperature.

* * * * *